(12) United States Patent
Cho et al.

(10) Patent No.: US 10,066,823 B2
(45) Date of Patent: Sep. 4, 2018

(54) DISPLAY DEVICE, DISPLAY SYSTEM, AND METHOD THEREOF

(71) Applicant: Samsung Electronics Co., Ltd., Suwon-si (KR)

(72) Inventors: Jin Hyun Cho, Seoul (KR); Joon Kang, Seoul (KR); Su Hwan Jin, Suwon-si (KR); Hyun Taek Na, Suwon-si (KR); Dae Yeon Yun, Seoul (KR); Yui Yoon Lee, Suwon-si (KR); Jeong II Kang, Yongin-si (KR); Dae Hyun Nam, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 15/288,287

(22) Filed: Oct. 7, 2016

(65) Prior Publication Data

US 2017/0102137 A1    Apr. 13, 2017

(30) Foreign Application Priority Data

Oct. 7, 2015    (KR) .................. 10-2015-0140779

(51) Int. Cl.
| | |
|---|---|
| G09F 13/04 | (2006.01) |
| G09F 13/08 | (2006.01) |
| F21V 29/52 | (2015.01) |
| F21V 29/65 | (2015.01) |
| G06F 1/32 | (2006.01) |
| G06F 1/20 | (2006.01) |
| F21Y 115/10 | (2016.01) |
| F21Y 115/15 | (2016.01) |

(52) U.S. Cl.
CPC .............. *F21V 29/52* (2015.01); *F21V 29/65* (2015.01); *G06F 1/20* (2013.01); *G06F 1/3265* (2013.01); *F21Y 2115/10* (2016.08); *F21Y 2115/15* (2016.08)

(58) Field of Classification Search
CPC . F21V 29/52; F21V 29/65; G06F 1/20; G06F 1/3265; F21Y 2115/15; F21Y 2115/10
See application file for complete search history.

(56) References Cited

U.S. PATENT DOCUMENTS

| | | | |
|---|---|---|---|
| 7,898,096 B1 | 3/2011 | Krupenkin | |
| 2006/0063207 A1 | 3/2006 | Lin et al. | |
| 2012/0069549 A1* | 3/2012 | Hsu | ........................ F21V 29/006 362/97.1 |

FOREIGN PATENT DOCUMENTS

| | | |
|---|---|---|
| KR | 10-2011-0052100 | 5/2011 |
| KR | 10-2012-0042403 | 5/2012 |
| KR | 10-2014-0110261 | 9/2014 |

* cited by examiner

Primary Examiner — Karabi Guharay
Assistant Examiner — Glenn Zimmerman
(74) *Attorney, Agent, or Firm* — Staas & Halsey LLP

(57) ABSTRACT

Disclosed herein are a display device, a display system and method thereof. The display device includes a display panel, a light emitter configured to emit light to display an image on the display panel, a pipe positioned adjacent to the light emitter and having a conductive fluid and a gas therein, and electrodes provided in the pipe and polarized, where heat is generated to move the conductive fluid inside the pipe when the light emitter emits light, and electricity is generated while moving and passing around the electrodes.

20 Claims, 21 Drawing Sheets

DISPLAY DEVICE, DISPLAY SYSTEM, AND METHOD THEREOF

CROSS-REFERENCE TO RELATED APPLICATIONS

This application claims the benefit of Korean Patent Application No. 10-2015-0140779, filed on Oct. 7, 2015 in the Korean Intellectual Property Office, the disclosure of which is incorporated herein by reference.

BACKGROUND

1. Field

Embodiments of the present disclosure relate to a display device, a display system and method thereof.

2. Description of the Related Art

Display devices are devices for displaying visual three-dimensional image information, and excellent flat display devices have been recently developed. A flat display device has excellent performance for various functions in terms of an installation space which is less constrained because a weight and a volume, which are disadvantages of a cathode ray tube, can be decreased, an easy implementation of images in a large screen, smooth flatness of the screen, a high-definition, and the like.

Typical examples of a flat-panel display device are a liquid crystal display (LCD) device, an electro-luminescence display (ELD) device, a field emission display (FED) device, a plasma display panel (PDP), a thin film transistor liquid crystal display (TFT-LCD), a flexible display, an organic light emitting diode (OLED) display, and like.

As a heat dissipation measure of the display device, a light emitting diode (LED) bar is attached to a bottom chassis or a graphite sheet is disposed on or below the LED bar in order for diffusing heat generated by the display device.

Meanwhile, as various technologies are implemented in display devices, an amount of electrical power required is also increased. Accordingly, related service providers seek technologies which secure heat dissipation performance and at the same time improve energy efficiency in a display device.

SUMMARY

Therefore, it is an aspect of the present disclosure to provide a display device and display system for providing energy harvesting and heat dissipation performance using a pipe which circulates an internal fluid using thermal energy.

Additional aspects of the disclosure will be set forth in part in the description which follows and, in part, will be obvious from the description, or may be learned by practice of the disclosure.

In accordance with one aspect of the present disclosure, a display device includes: a display panel; a light emitter configured to emit light to display an image on the display panel; a pipe positioned adjacent to the light emitter and having a conductive fluid and a gas therein; electrodes provided in the pipe and polarized; and an energy storage portion configured to store electric energy generated in the pipe, where heat is generated to move the conductive fluid inside the pipe when the light emitter emits light, and electricity is generated while moving and passing around the electrodes.

In addition, the display device may further include: a main body; and a bottom chassis configured to form a rear surface of the main body, wherein the pipe may be positioned between the light emitter and the bottom chassis.

A coupling groove may be formed in the bottom chassis such that the pipe is inserted into in a surface in contact with the pipe.

The pipe may be formed in a form of a closed circuit pipe, and, the conductive fluid and the gas may circulate in the pipe when heat is transferred from the light emitter.

The pipe may include an evaporator in contact with the light emitter, an electricity generator on which the electrodes are formed, and a condenser.

The display device may further include a main body, wherein when there are a plurality of light emitters and a plurality of pipes, the plurality of light emitters may be formed at each of both side surfaces of the main body, the plurality of pipes may be positioned to match each of the light emitters of the both side surfaces of the main body, and the evaporator may be adjacent to the light emitters.

The display device may further include a main body, wherein when the light emitter is formed on one or the other side surface of the main body, the pipe may be positioned so that the evaporator is adjacent to the light emitter formed on the one or the other side surfaces of the main body.

The pipe may be formed to have a size which covers a front surface of the main body or a size which covers a part of the front surface of the main body.

The display device may further include a main body, wherein when there are a plurality of light emitters and a plurality of pipes, the plurality of light emitters may be disposed on a front surface of the main body in a form of a plurality of rows, and the plurality of pipes may be positioned so that the evaporator is adjacent to each of the light emitters disposed in the form of a plurality of rows.

An inside of the pipe may be in a vacuum state.

The pipe may be formed of an insulating material.

The pipe may be formed in a form of a closed loop of any one of a spiral, a polygon, a circle, a zigzag, or a combination thereof.

The pipe may have a cross section in a circular or polygonal shape.

The light emitter may include a light emitting diode or an organic light emitting diode.

The conductive fluid and the gas may have flow speeds controlled by adjusting a temperature of the light emitter.

The gas may be formed in a form of a bubble.

In addition, the energy storage portion may include a power circuit, a super capacitor, or a battery.

In accordance with another aspect of the present disclosure, a display system includes: a display panel; a light emitter configured to emit light to display an image on the display panel; electrodes provided in a pipe and polarized; the pipe positioned adjacent to the light emitter and having a conductive fluid and a gas therein, wherein heat is generated to move the conductive fluid inside the pipe when the light emitter emits light and electricity is generated while the conductive fluid moves and passes around the electrodes; an energy storage portion configured to store electrical energy; and a processor configured to store the electricity in the energy storage portion.

In addition, the energy storage portion may include a power circuit, a super capacitor, or a battery.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
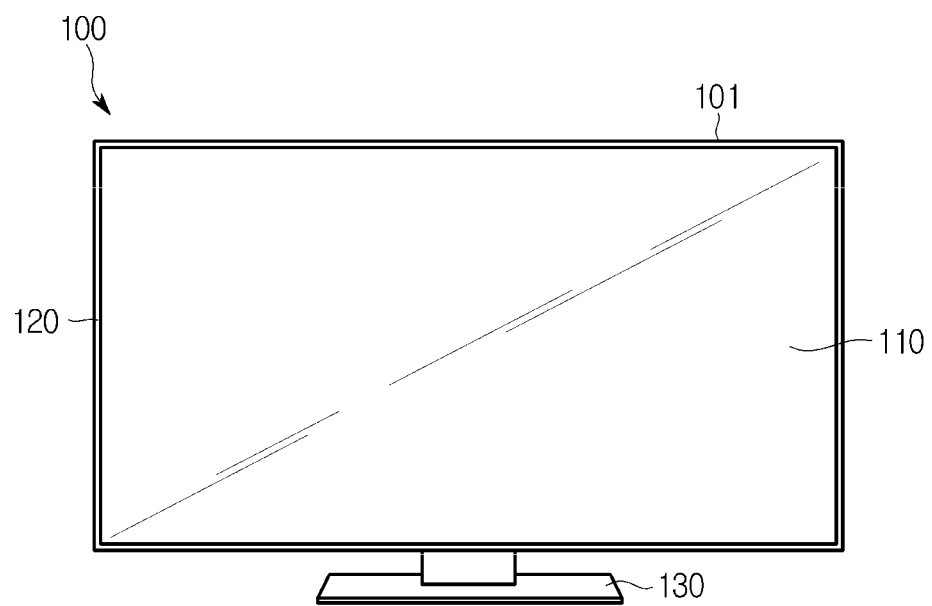
FIG. 1 is a view illustrating an exterior of a display device.

Purposes, specific advantages, and novel features of the present disclosure will be clear from exemplary embodiments and the following detailed descriptions in connection with the accompanying drawings. In this specification, when reference numerals are assigned to components of each drawing, it should be noted that, the same numerals are assigned to the same components when the same components are illustrated in different drawings whenever possible. In descriptions of the present disclosure, when detailed descriptions of related well-known technology are deemed to unnecessarily obscure the gist of the present disclosure, they will be omitted. In this specification, although the terms first, second, etc. are used to distinguish one component from another, these components are not limited by these terms.

Hereinafter, an exemplary embodiment of the present disclosure will be described with reference to accompanying drawings in detail. Like reference numerals refer to the like elements throughout. The embodiments are described below to explain the present invention by referring to the figures.

FIG. 1 is a view illustrating an exterior of a display device.

Referring to FIG. 1, a display device 100 is a device which displays data such as an image by emitting light according to an input image signal and may include a main body 101, a display panel 110 configured to display the image, a front frame 120 configured to support the display panel, and a support 130 configured to support the main body 101.

Here, the display device 100 may include a liquid crystal display (LCD) device, an electro-luminescence display (ELD) device, a field emission display (FED) device, a plasma display panel (PDP), a thin film transistor LCD (TFT-LCD), a flexible display, an organic light emitting diode (OLED) display, or a cathode ray tube (CRT) display, but the display device 100 is not limited thereto.

In addition, when the display device 100 is a wall-hanging type, the support 130 may be omitted.

Figure 2:
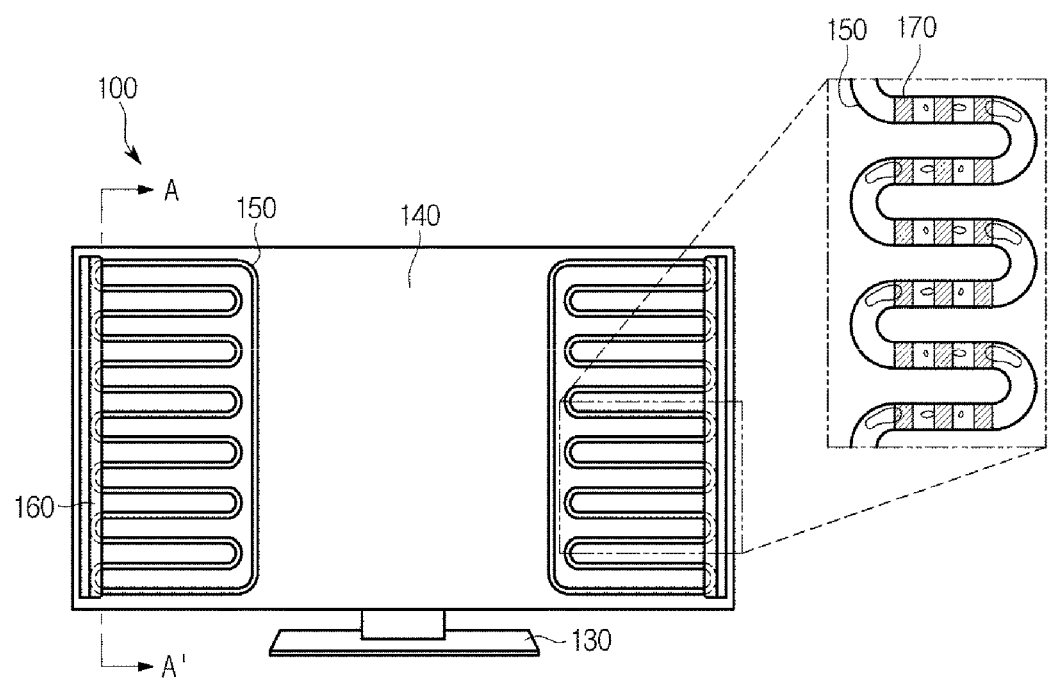
FIG. 2 is a view illustrating a structure in which a pipe and a light emitter are installed in the display device.
Figure 3:
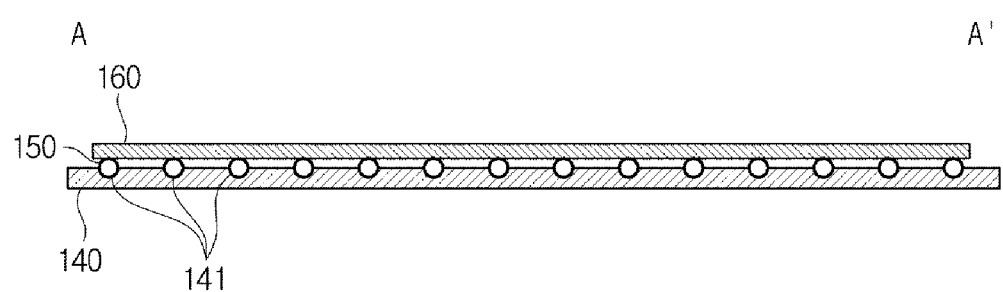
FIG. 3 is a cross-sectional view illustrating a structure in which the pipe is coupled to the light emitter.
Figure 4:
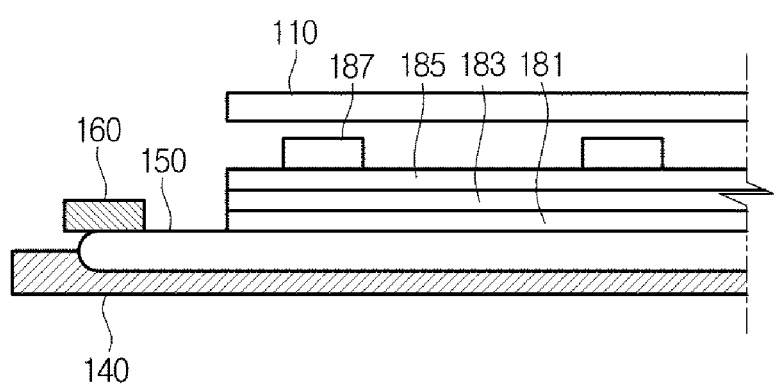
FIG. 4 is a cross-sectional view illustrating one embodiment of a structure of the display device.
Figure 11:
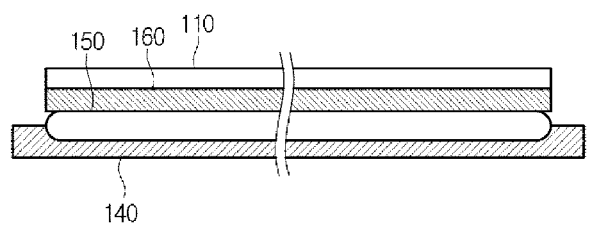
FIG. 11 is a cross-sectional view illustrating another embodiment of a structure of the display device.

FIG. 2 is a view illustrating a structure in which a pipe and a light emitter are installed in the display device, FIG. 3 is a cross-sectional view illustrating a structure in which the pipe is coupled to the light emitter, and FIGS. 4 and 11 are cross-sectional views illustrating a structure of the display device.

Referring to FIG. 2, the display device 100 may include the main body 101, the display panel 110, a bottom chassis 140 forming a rear surface of the main body 101, a light emitter 160 configured to emit light for displaying an image on the display panel 110, electrodes 170 provided in a pipe 150 and polarized, and the pipe 150 disposed adjacent to the light emitter 160 and having a conductive fluid and gas therein, wherein heat is generated to move the conductive fluid inside the pipe 150 when the light emitter 160 emits light, and electricity is generated while the conductive fluid moves and passes around the electrodes.

The light emitter 160 may be formed with a light emitting diode (LED). As illustrated in FIG. 2, the LED may be bar type. The light emitter 160 may also be a self-luminous type such as an OLED and will be described in detail below.

The gas may be formed in the form of bubbles.

The pipe may be a pulsating heat pipe.

In addition, the pipe 150 is in the form of a closed circuit filled with a conductive fluid and gas, and as light is emitted by the light emitter 160, the conductive fluid may pass through a region in which the electrodes 170 are formed and may generate electricity when heat is transmitted. As illustrated in FIG. 2, a pattern of the electrodes 170 may be formed on an outer surface of the pipe 150.

Referring to FIG. 3 which is a cross-sectional view taken along line A-A' of FIG. 2, the pipe 150 may be disposed between the light emitter 160 and the bottom chassis 140. Here, coupling grooves 141 may be formed in the bottom chassis 140 such that the pipe 150 is inserted into a surface in contact with the pipe 150.

A structure in which the bottom chassis 140, the pipe 150, and the light emitter 160 are coupled to each other may be a structure in which a light guide plate 181, a light conversion layer 183 disposed on the light guide plate, a circuit board 185 on which electronic components 187 are mounted, and the display panel 110 are coupled to each other as illustrated in FIG. 4. The structure of the display device 100 illustrated in FIG. 4 is an example of a case provided with a backlight.

Here, the light guide plate 181 may be a configuration for guiding light incident from the light emitter 160 to the light conversion layer 183.

The light conversion layer 183 may be installed to be spaced apart from the light emitter 160 and may be a configuration which converts light incident from the light emitter 160 to white light and emits the white light toward the display panel 110.

The electronic components 187 may be components having various functions and may include, for example, condensers, and capacitors.

Meanwhile, the display device 100 may also be a self-luminous type display, and a structure of the display device 100 in that case may be a structure illustrated in FIG. 11.

Referring to FIG. 11, a display device 100 may be a structure in which a bottom chassis 140, a pipe 150, a light emitter 160, and a display panel 110 are sequentially stacked and coupled to each other. Here, an insertion position of the light emitter 160 may also be a position between the bottom chassis 140 and the pipe 150 as long as heat is transferred from the position to the pipe 150. A self-luminous type light emitter 160 is a type which emits light to the display panel 110 using self-illumination rather than a type of separated backlight and may be provided to be in contact with one front surface of the display panel 110.

In addition, the light emitter 160 may be an OLED, which may emit light by itself, but is not limited thereto, and may be any self-illuminating component.

The light emitter 160 illustrated in FIG. 11 is a configuration using a self-illumination phenomena in which electrons and holes respectively injected from negative and positive electrodes are coupled to each other in organic materials to generate light, such as an OLED.

As the light emitter 160 in FIG. 11 is a type which is disposed on a front surface corresponding to the display panel 110 unlike a light emitter in the type of a backlight shown in FIG. 4, evaporator regions, electricity generator regions, and condenser regions in the pipe 150 in contact with the light emitter 160 are not fixed, and, according to a temperature difference of the light emitter 160 itself, relatively high temperature regions are the evaporator regions and relatively low temperature regions are the condenser regions.

For example, a temperature of a first pixel is higher than that of a second pixel when light brightness of the first pixel is brighter than that of the second pixel in the light emitter 160, and through this principle, a temperature difference may occur at a front surface of the light emitter 160.

In addition, a conductive fluid 151 and a gas 153 in the pipe 150 flow due to the temperature difference of the light emitter 160, and the flowing conductive fluid reacts to the polarized electrodes 170 provided on an outer surface of the pipe 150 to generate electrical energy.

That is, in the pipe 150 in FIG. 11, the evaporator regions and the condenser regions vary according to the temperature difference transferred from the light emitter 160. The electrodes 170 may be patterned on any region on the outer surface of the pipe 150 due to the above-described properties of the pipe 150.

FIGS. 5 to 10 are views illustrating a configuration of the pipe in detail.

Figure 5:
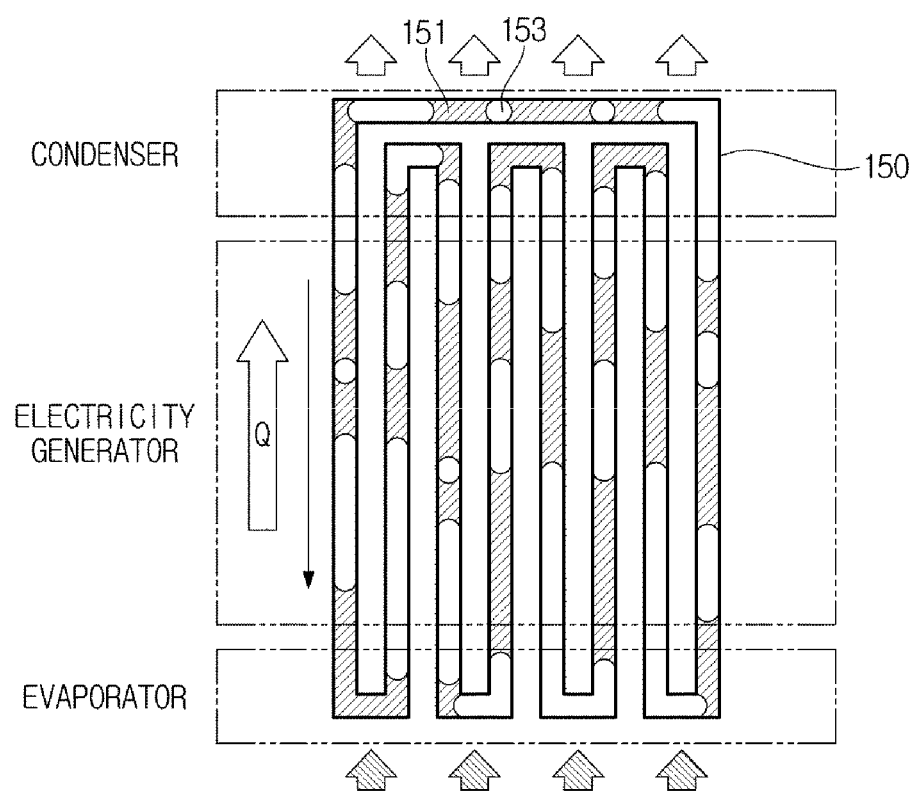
FIGS. 5 to 10 (FIGS. 5, 6, 7, 8, 9 and 10) are views illustrating a configuration of the pipe in detail.

As illustrated in FIG. 5, the pipe 150 is formed in the form of a closed circuit, and the conductive fluid 151 and the gas 153 may move and circulate in the pipe 150 when heat is transmitted according to light emitted from the light emitter 160 (see FIGS. 2 and 11).

Figure 6:
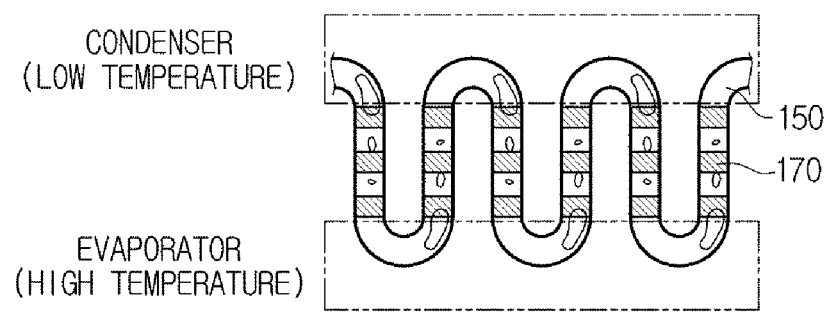

When the light emitter 160 is a non-self-luminous type, evaporators, electricity generators, and condensers of the pipe 150 are fixed as illustrated in FIGS. 5 and 6, and when the light emitter 160 is a self-luminous type, the evaporators and the condensers of the pipe 150 may vary according to a temperature difference of the light emitter 160. A principle of a flow of the conductive fluid 151 according to the temperature difference in the pipe 150 is naturally applied regardless of whether the light emitter 160 is a self-luminous type or a non-self-luminous type.

Here, the pipe 150 may be formed of an insulating material. This is to obviate factors that interrupt generation of electricity between the electrodes 170 provided in the pipe 150 and the conductive fluid 151 electrically charged in the pipe 150.

In addition, an inside of the pipe 150 may be in a vacuum state. Since the inside of the pipe 150 is in the vacuum state, a boiling point of the fluid is relatively lowered, and thus the conductive fluid 151 may also move due to heat transferred from the light emitter 160.

The pipe 150 may include the evaporators in contact with the light emitter 160, the electricity generators having an outer surface on which the electrodes 170 are formed, and the condensers. As illustrated in FIG. 5, the pipe 150 may be sequentially divided into the evaporators, the electricity generators, and the condensers, but the pipe 150 is not limited thereto and may be changed according to a necessity of a user. When the light emitter 160 is a self-luminous type, positions of the evaporators and the condensers of the pipe 150 may vary.

Referring to FIGS. 5 and 6, the evaporators may be portions at which thermal energy may be obtained from the light emitter 160 and temperatures thereof are relatively high in the pipe 150, the electricity generators may be portions at which the electrodes 170 are patterned on an outside of the pipe 150, and the condensers may be portions at which temperatures thereof are lower than those of the evaporators.

Here, as the conductive fluid 151 passes through the electricity generators, the conductive fluid 151 may generate electricity while passing between the polarized electrodes formed on the outside of the electricity generators. Flow speeds of the conductive fluid and the gas may be controlled by adjusting a temperature of the light emitter 160. For example, when an amount of heat input introduced into the light emitter 160 is increased, the flow speed of the conductive fluid may be increased. When the speed of the conductive fluid is increased, an amount of generated electricity may also be increased. That is, the speed of the conductive fluid is proportional to the amount of generated electricity.

In addition, a gas around the condensers may be phase-shifted into a liquid.

Figure 7:
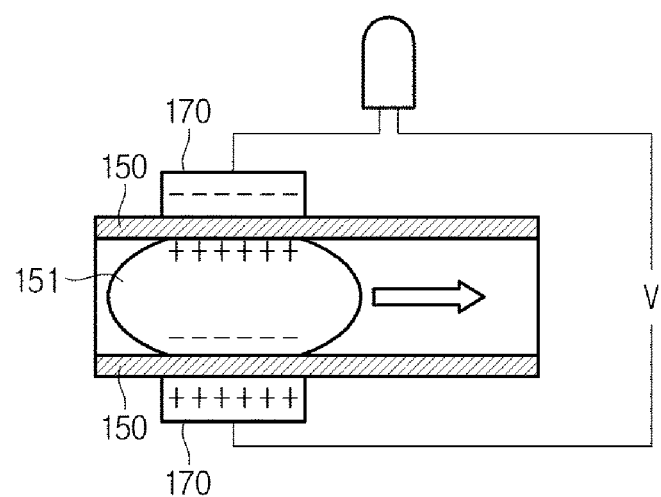
Figure 8:
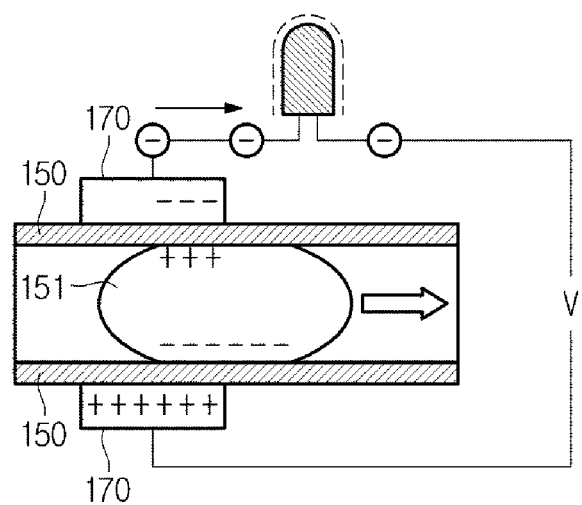
Figure 9:
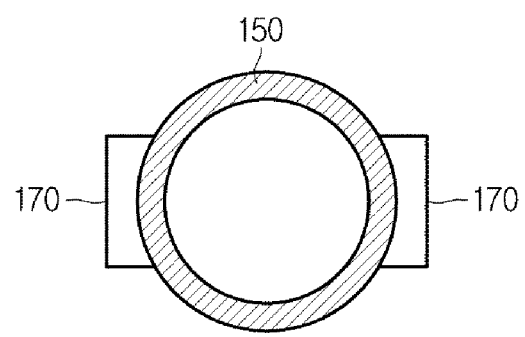
Figure 10:
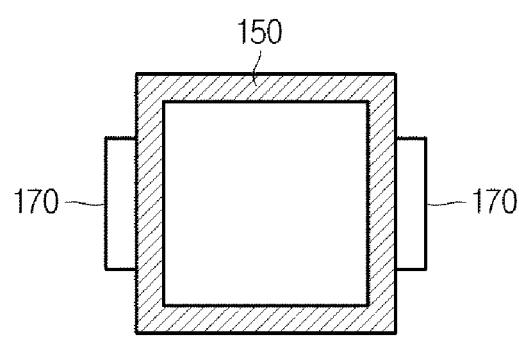

Referring to FIGS. 7 and 8, the conductive fluid 151 may generate electrical energy while passing the polarized electrodes 170 in the pipe 150.

Such a pipe 150 may have a cross section in a circular shape (see FIG. 9) or polygonal shape (see FIG. 10) but is not limited thereto.

Although not illustrated in the drawings, the display device 100 may further include an energy storage portion (not shown) configured to store the electrical energy generated in the pipe 150. Here, the energy storage portion may be a power circuit, a super capacitor, or a battery, but the energy storage portion is not limited thereto.

That is, the display device 100 stores the electricity generated in the pipe 150 in the energy storage portion and may use the electricity as standby power and power for driving the display device.

Figure 12:
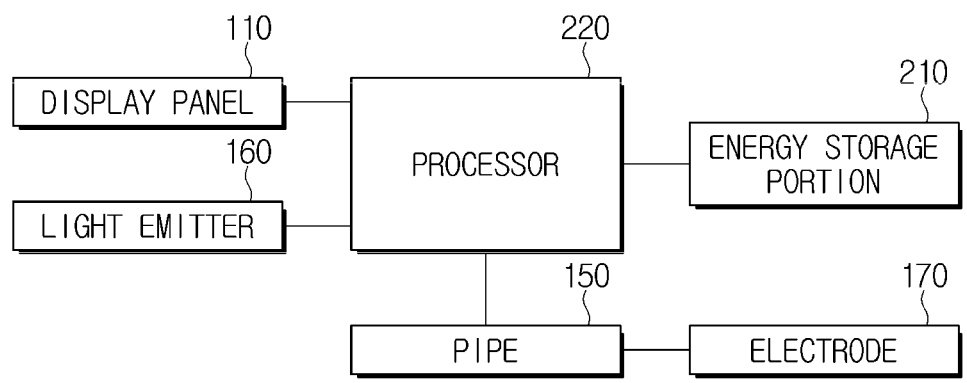
FIG. 12 is a view illustrating a configuration of a display system.

FIG. 12 is a view illustrating a configuration of a display system.

Referring to FIG. 12, a display system 200 may include a display panel 110, a pipe 150, a light emitter 160, an energy storage portion 210, and a processor 220.

The light emitter 160 is a component configured to emit light for displaying an image on the display panel 110 and may generate heat.

The electrodes 170 are provided in the pipe and may be polarized.

The pipe 150 may be a component positioned adjacent to the light emitter 160 and have a conductive fluid and a gas therein, wherein, heat is generated to move the conductive fluid inside the pipe 150 when the light emitter 160 emits light, and electricity is generated while the conductive fluid moves and passes around the electrodes.

The energy storage portion 210 may store electrical energy.

Here, the energy storage portion 210 may be a power circuit, a super capacitor, or a battery, but the energy storage portion 210 is not limited thereto.

The processor 220 may store the electricity generated in the pipe 150 in the energy storage portion 210.

In addition, the processor 220 may use the electrical energy stored in the energy storage portion 210 as energy for driving the display panel 110. For example, the electrical energy stored in the energy storage portion 210 may be used as standby power of the display device 100, but the processor 220 is not limited thereto and may be variously used for driving the display device 100.

Figure 13:
FIG. 13 is a view for describing a method of energy harvesting in the display system.

FIG. 13 is a view for describing a method of energy harvesting in the display system.

As power is supplied to the display device 100 (power-on) and the light emitter 160 emits light, evaporators of the pipe 150 are heated to increase a pressure thereof and a conductive fluid and gas positioned in evaporator regions of the pipe 150 move to condenser regions of the pipe 150 in which temperatures are relatively low.

Here, the conductive fluid passes electricity generator regions positioned between the evaporators and condensers of the pipe 150, and, at this point, generates electrical energy while passing between the polarized electrodes 170.

The electrical energy generated in this manner is stored in the energy storage portion 210 and may be used for driving and operating the display device 100. For example, the stored electrical energy may be used as standby power of the display device 100, but the stored electrical energy is not limited thereto.

The condensers of the pipe 150 may phase-shift a gas around the condensers into a liquid. In this process, the conductive fluid and the gas in the pipe 150 circulate in the pipe 150 having the form of a closed loop.

That is, in the disclosed disclosure, since a phase-shift of the conductive fluid occurs due to the heat transferred from the light emitter 160, the fluid moves and generates kinetic energy due to a pressure difference generated by the above-described phase-shift, and thus electricity may be generated even with no additional input source from the outside.

Here, since an inside of the pipe 150 is in the vacuum state, a boiling temperature of the fluid in the pipe is relatively low, and thus the conductive fluid may be moved by being heated only by the light emitter 160 such as an LED.

In addition, to improve speed of the conductive fluid, an amount of heat input from the light emitter 160 may be adjusted to be greater. Accordingly, the heat dissipation performance of the display device 100 may be improved. In addition, when the speed of the conductive fluid is increased, an amount of generated electrical energy is increased, and thus a power generating capacity may also be improved.

Figure 14:
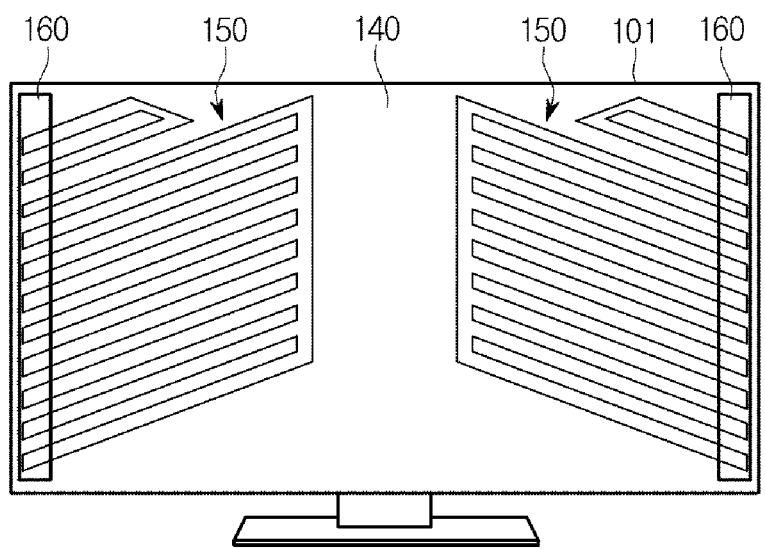
FIGS. 14 to 16 (FIGS. 14, 15 and 16) are views illustrating one embodiment of a shape of a pipe.
Figure 15:
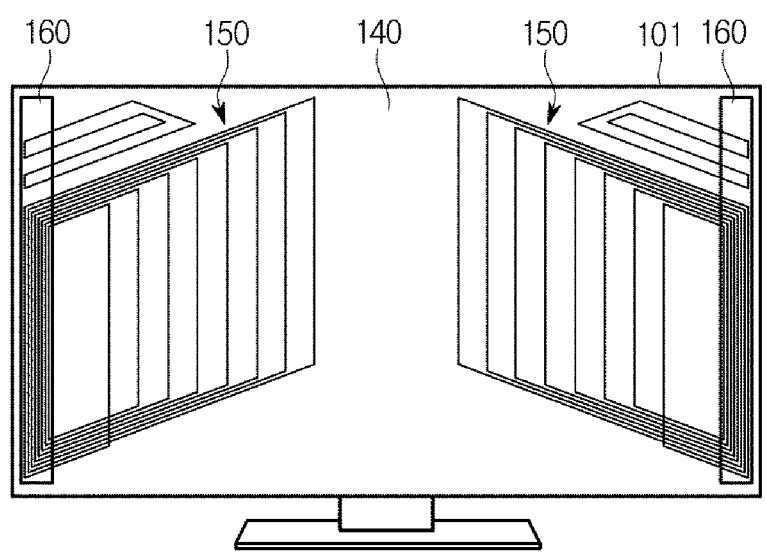
Figure 16:
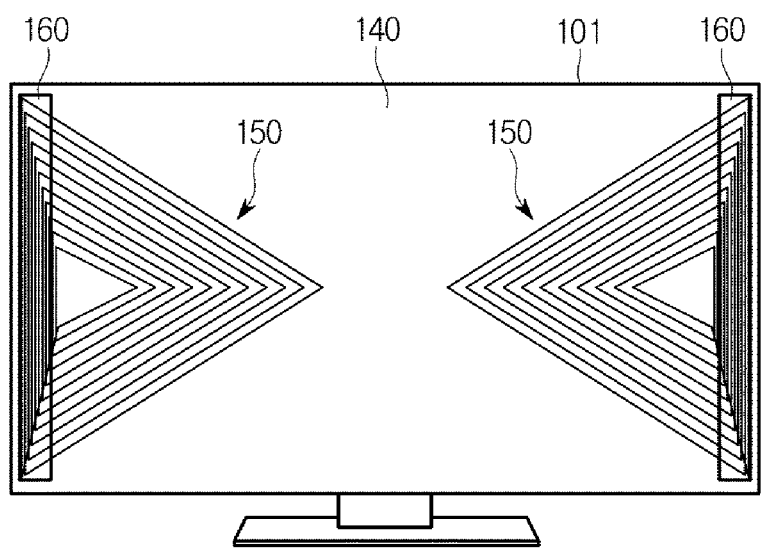
Figure 17:
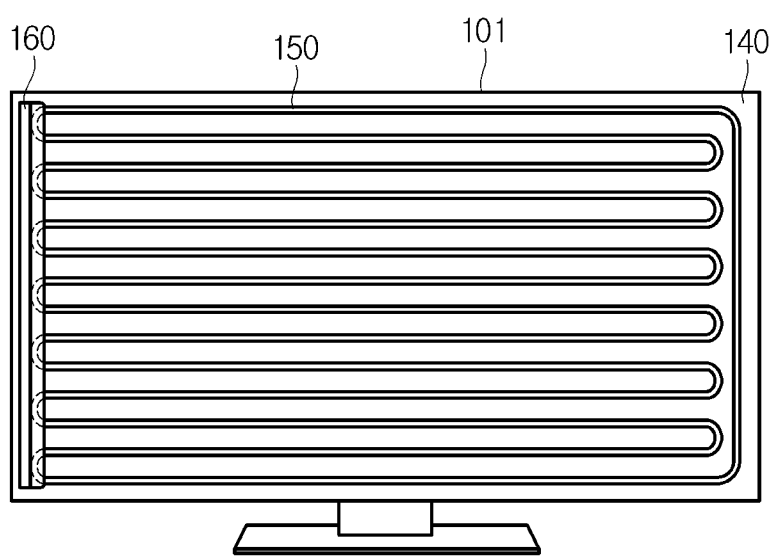
FIGS. 17 to 20 (FIGS. 17, 18, 19 and 20) are views illustrating another embodiment of a shape of a pipe.

FIGS. 14 to 16 are views illustrating one embodiment of a shape of a pipe.

Referring to FIGS. 2 and 14 to 16, when there are a plurality of light emitters 160 and a plurality of pipes 150, the plurality of light emitters 160 are formed at each of both sides of the main body 101, the plurality of pipes 150 are positioned to match each of the light emitters 160 of the both sides thereof, and evaporators may be adjacent to the light emitters 160.

As illustrated in FIGS. 2 and 14 to 16, the pipe 150 may be formed in the form of a closed loop of any one of a spiral, a polygon, a circle, a zigzag, or a combination thereof.

FIGS. 17 to 20 are views illustrating another embodiment of a shape of a pipe.

As illustrated in FIGS. 17 to 20, when a light emitter 160 is formed at one or the other side surface of a main body 101, a pipe 150 may be positioned so that evaporators are adjacent to the light emitter 160 formed at one side or the other side surface of the main body 101.

Figure 18:
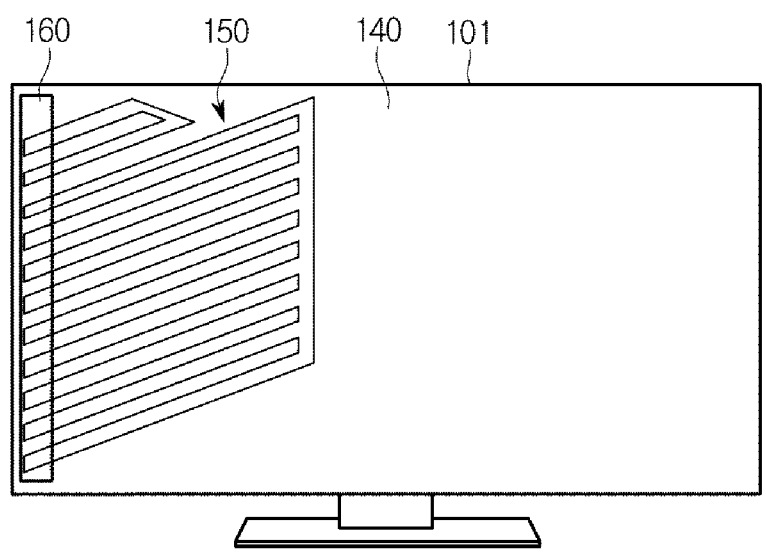
Figure 19:
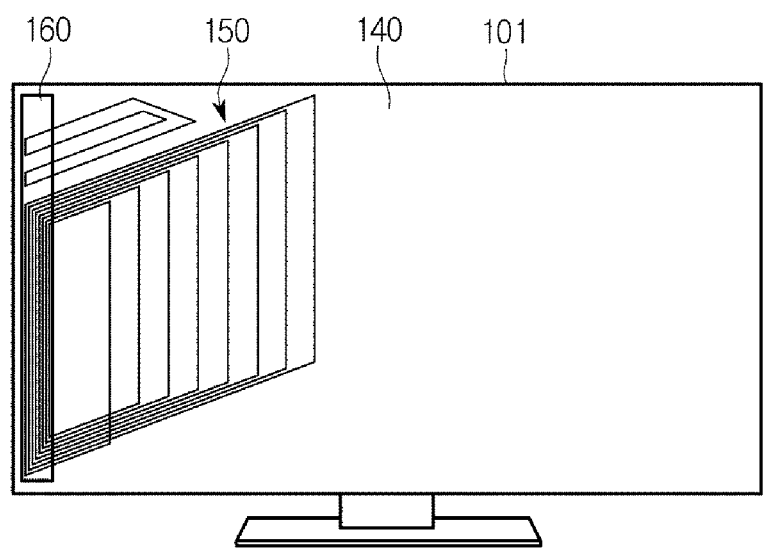
Figure 20:
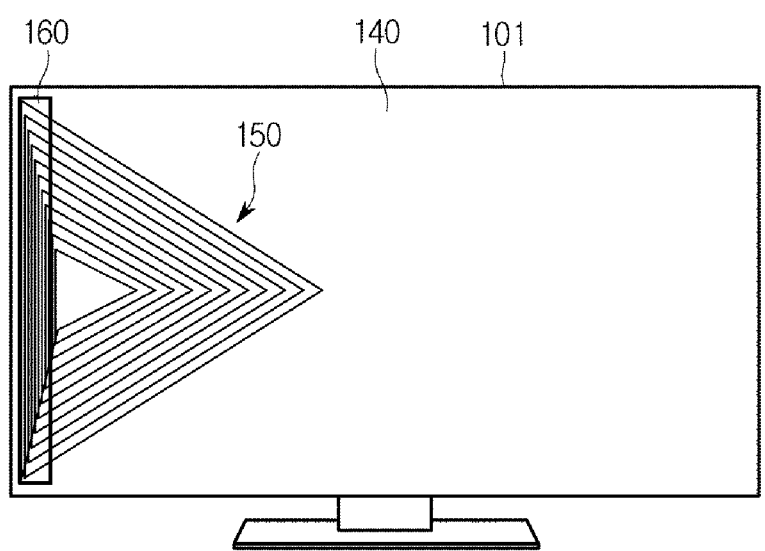

Here, the pipe 150 may be formed to have a size which covers a front surface of the main body 101 (see FIG. 17) or may be formed to have a size which covers a part of the front surface of the main body 101 (see FIGS. 18 to 20).

Figure 21:
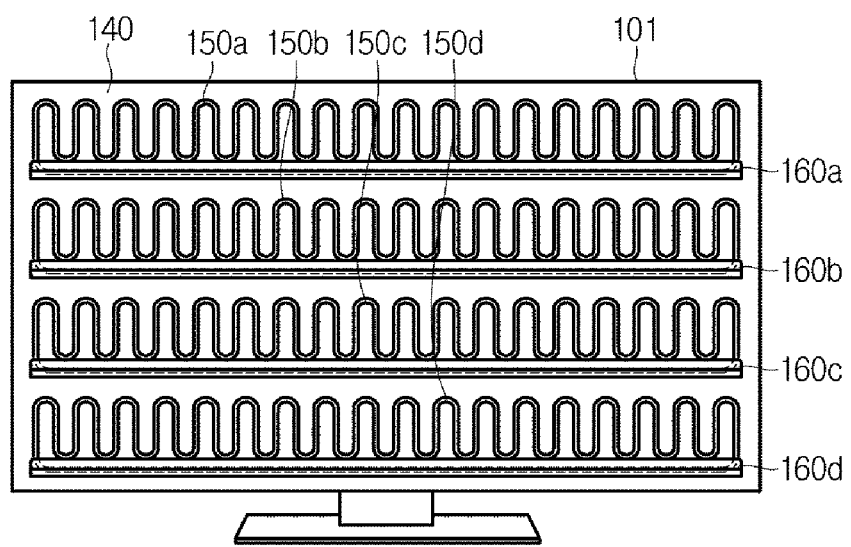
FIG. 21 is a view illustrating still another embodiment of a shape of a pipe.

FIG. 21 is a view illustrating still another embodiment of a shape of a pipe.

When there are a plurality of light emitters 160a, 160b, 160c, and 160d and a plurality of pipes 150a, 150b, 150c, and 150d, the plurality of light emitters 160a, 160b, 160c, and 160d may be disposed on a front surface of a main body 101 in the form of a plurality of rows.

In addition, the plurality of pipes 150a, 150b, 150c, and 150d may be positioned so that evaporators are adjacent to each of the light emitters 160a, 160b, 160c, and 160d disposed in the form of a plurality of rows, respectively.

Since the pipes of the disclosed disclosure may be positioned to extend on the front surface or a part of a surface of the main body 101, it is expected to have an advantage of improving a strength of the display device in addition to effects of the above-described heat dissipation performance and energy harvesting.

As is apparent from the above description, since a pipe configured to generate electrical energy by circulating an internal conductive fluid through a heat source is provided in a display device, effects in which energy can be harvested by using kinetic energy of the fluid while simultaneously improving a heat dissipation performance can be expected.

In addition, since electrical energy is variously used for driving the display device, such as, using the electrical energy for standby power of the display device, an effect in which energy efficiency is improved can be expected.

The present disclosure has been described in detail with reference to the exemplary embodiments. However, the exemplary embodiments should be considered in a descriptive sense only, and the present disclosure is not limited thereto. It should be clear to those skilled in the art that various modifications and improvements within the scope of the invention may be made.

Simple modifications and alterations of the present disclosure fall within the scope of the present disclosure which is defined by the accompanying claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A display device comprising:
    a display panel;
    a light emitter configured to emit light to display an image on the display panel;
    a pipe positioned adjacent to the light emitter, the pipe having a conductive fluid and a gas therein;
    electrodes provided in the pipe, the electrodes being polarized; and
    an energy storage portion configured to store electrical energy generated in the pipe,
    wherein heat is generated to move the conductive fluid inside the pipe when the light emitter emits light, and electricity is generated while the conductive fluid and the gas move inside the pipe in which the electrodes are provided.

2. The display device of claim 1, further comprising:
    a main body; and
    a bottom chassis configured to form a rear surface of the main body, wherein the pipe is positioned between the light emitter and the bottom chassis.

3. The display device of claim 1, wherein the pipe is formed in a form of a closed circuit pipe, and the conductive fluid and the gas circulate in the pipe when heat is transferred from the light emitter.

4. The display device of claim 1, wherein the pipe includes:
an evaporator in contact with the light emitter;
an electricity generator on which the electrodes are formed; and
a condenser.

5. The display device of claim 1, wherein an inside of the pipe is in a vacuum state.

6. The display device of claim 1, wherein the pipe is formed of an insulating material.

7. The display device of claim 1, wherein the pipe is formed in a form of a closed loop of any one of a spiral, a polygon, a circle, a zigzag, or a combination thereof.

8. The display device of claim 1, wherein the pipe has a cross section in a circular or polygonal shape.

9. The display device of claim 1, wherein the light emitter includes a light emitting diode or an organic light emitting diode.

10. The display device of claim 1, wherein the conductive fluid and the gas have flow speeds controlled by adjusting a temperature of the light emitter.

11. The display device of claim 1, wherein the gas is formed in a form of a bubble.

12. The display device of claim 1, wherein the energy storage portion includes a power circuit, a super capacitor, or a battery.

13. The display device of claim 1, wherein the electrical energy is used to drive the display device in a standby power mode.

14. The display device of claim 2, wherein a coupling groove is formed in the bottom chassis such that the pipe is accommodated on a surface of the bottom chassis which is in contact with the pipe.

15. The display device of claim 4, further comprising a main body,
wherein, when the light emitter includes a plurality of light emitters and the pipe includes a plurality of pipes, the plurality of light emitters are formed at each of both side surfaces of the main body, the plurality of pipes are positioned to match each of the plurality of light emitters of the both side surfaces of the main body, and the evaporator is adjacent to the plurality of light emitters.

16. The display device of claim 4, further comprising:
a main body,
wherein, when the light emitter is formed on one or the other side surface of the main body, the pipe is positioned so that the evaporator is adjacent to the light emitter formed on the one or the other side surface of the main body.

17. The display device of claim 4, further comprising a main body,
wherein, when the light emitter includes a plurality of light emitters and the pipe includes a plurality of pipes, the plurality of light emitters are disposed on a front surface of the main body in a form of a plurality of rows, and the plurality of pipes are positioned so that the evaporator is adjacent to each of the plurality of light emitters disposed in the form of the plurality of rows.

18. The display device of claim 16, wherein the pipe is formed to have a size which covers a front surface of the main body or a size which covers a part of the front surface of the main body.

19. A display system comprising:
a display panel;
a light emitter configured to emit light to display an image on the display panel;
a pipe positioned adjacent to the light emitter and having a conductive fluid and a gas therein;
electrodes provided in the pipe, the electrodes being polarized;
an energy storage portion configured to store electrical energy; and
a processor configured to store the electricity in the energy storage portion,
wherein heat is generated to move the conductive fluid inside the pipe when the light emitter emits light and electricity is generated while the conductive fluid and the gas move inside the pipe in which the electrodes are provided.

20. The display system of claim 19, wherein the energy storage portion includes a power circuit, a super capacitor, or a battery.

* * * * *